(No Model.)
D. HOUGHTON.
WIRE CUTTER.
No. 337,159.  Patented Mar. 2, 1886.
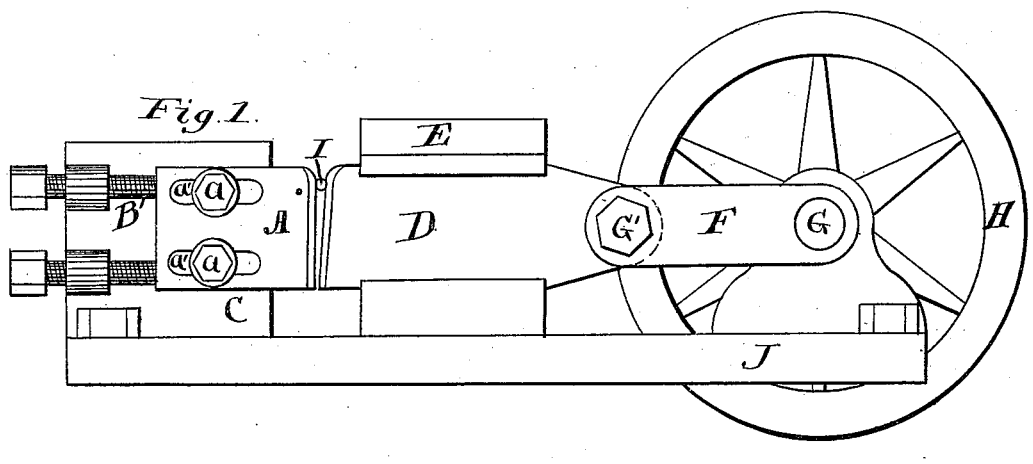
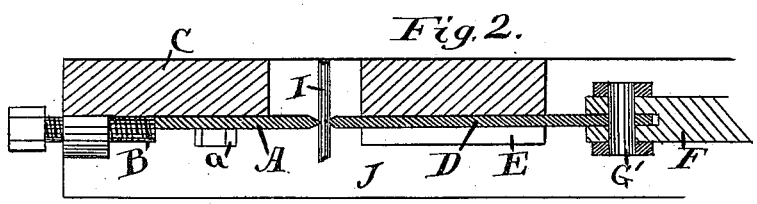
Witnesses:
H. W. Parmenter.
E. J. Clark
Inventor:
Darius Houghton
by S. W. Bates
his atty.

UNITED STATES PATENT OFFICE.

DARIUS HOUGHTON, OF SKOWHEGAN, ASSIGNOR TO CALVIN COLBY AND SEWALL A. DINSMORE, BOTH OF BINGHAM, MAINE.

WIRE-CUTTER.

SPECIFICATION forming part of Letters Patent No. 337,159, dated March 2, 1886.

Application filed April 2, 1885. Renewed February 2, 1886. Serial No. 190,639. (No model.)

*To all whom it may concern:*

Be it known that I, DARIUS HOUGHTON, a citizen of the United States, residing at Skowhegan, in the county of Somerset and State of Maine, have invented certain new and useful Improvements in Wire-Cutters, of which the following is a specification, reference being had therein to the accompanying drawings.

My invention relates to machines for cutting off wire, and it is particularly designed for cutting off boot-calks after they have been formed on the end of a length of wire, my object being to cut the calk off so as to leave a smoothly-finished end. I accomplish this result by means of the mechanism shown in the accompanying drawings, in which—

Figure 1 is a side elevation. Fig. 2 is a section through x x of Fig. 1.

A is a fixed cutter attached to the solid support C by means of the bolts a a. The slots a' a' allow the position of the cutter to be accurately adjusted, while it is held firmly in place by the screws B B. The movable cutter D rests in slots or guides in the block E. The cutting-edges of cutters A and D are so adjusted that they are in exact line with each other. The space between these edges when they are nearest together is just sufficient at the top to admit the wire to be cut, and at the bottom they approach until they nearly touch each other—*i. e.*, they come within about a hair's breadth of touching each other—as it will be readily understood that should they rub together they would become dull, and would thus require frequent sharpening. The end of the cutter D is connected with the shaft G by the sweep or connecting-rod F. The fly-wheel H is hung on shaft G. The shaft or journal G is made slightly eccentric, so that when it revolves it imparts a reciprocal or oscillating motion to the cutter D, sliding it to and away from the cutter A. This reciprocal or intermittent motion is very rapid, and the distance moved by the cutter is very slight. In practice I move the cutter D one-sixteenth of an inch.

To cut off the wires I place them between the cutters at the top and pass them downward between the cutters, keeping them turning by hand or otherwise as they pass down through. Then by a slight pressure of the wires against one of the cutters and by the rapid motion of the cutters, combined with the turning of the wires, they will be cut off, and will have smoothly finished and pointed ends. Hitherto such boot-calks, having been forged on the end of a wire, were sheared off and afterward smoothed on an emery-wheel.

The cutter A, instead of being stationary, can be made movable.

I claim—

1. In a wire-cutting machine, the two cutters A and D, their two cutting-edges forming a tapering recess, the cutter D having a reciprocating motion to and from the cutter A, substantially as described.

2. In a wire-cutting machine, two cutters having a tapering recess between their cutting-edges, and means, substantially as described, whereby the distance between said cutting-edges is alternately increased and decreased and an intermittent cutting of the wire is effected, substantially as set forth.

In testimony whereof I affix my signature in presence of two witnesses.

DARIUS HOUGHTON.

Witnesses:
H. D. BATES,
S. W. BATES.